United States Patent [19]

Nack et al.

[11] 4,154,581
[45] * May 15, 1979

[54] TWO-ZONE FLUID BED COMBUSTION OR GASIFICATION PROCESS

[75] Inventors: Herman Nack; Ke-Tien Liu, both of Columbus, Ohio

[73] Assignee: Battelle Development Corporation, Columbus, Ohio

[*] Notice: The portion of the term of this patent subsequent to Apr. 18, 1995, has been disclaimed.

[21] Appl. No.: 868,959

[22] Filed: Jan. 12, 1978

[51] Int. Cl.² .......................... C10J 3/54; F22B 1/02; F23D 1/00
[52] U.S. Cl. .................... 48/197 R; 34/10; 48/206; 48/210; 110/245; 110/342; 110/347; 122/4 D; 423/244; 423/659; 423/DIG. 16
[58] Field of Search ............. 122/4 D; 48/197 R, 206, 48/210; 423/242, 244, 659, DIG. 16, 244 A; 34/10; 110/245, 347, 342

[56] References Cited

U.S. PATENT DOCUMENTS

| | | | |
|---|---|---|---|
| 2,683,657 | 7/1954 | Garbo | 48/206 |
| 2,701,758 | 2/1955 | Danulat et al. | 48/206 |
| 3,597,327 | 8/1971 | Squires | 201/12 |
| 3,847,563 | 11/1974 | Archer et al. | 48/77 |
| 4,084,545 | 4/1978 | Nack et al. | 122/4 D |

*Primary Examiner*—S. Leon Bashore
*Assistant Examiner*—Peter F. Kratz
*Attorney, Agent, or Firm*—Barry S. Bissell

[57] ABSTRACT

A method of operating a fluidized bed system in a single vessel, typically as a combustor system for power or steam generation burning high-sulfur coal or as a gasifier for high-sulfur coal, which comprises forming an entrained fluidized bed in a first space region containing a first solid bed particle component, such as sand or hematite ore containing over 90% $Fe_2O_3$, forming in a limited space region partially within the first region a dense fluidized bed containing a second solid bed particle component, such as larger particles of the hematite, both first and second component particles essentially comprising a material having long-term physical and chemical stability in the fluidized bed system so as to be substantially nonagglomerating and not subject to substantial attrition therein, effecting division of the dense fluidized bed into upper and lower zones, providing a recirculation path such as through a cyclone separator and particle reservoir for the first particle component from the first space region through the upper zone of the dense fluidized bed in the more limited space region, operating the fluidized bed system at a velocity such that the second component particles are effectively retained in the dense fluidized bed in the more limited space region, whereas the first component particles recirculate and interpenetrate through the upper zone thereof commingling with the second component particles, and maintaining different temperatures in the upper and lower zones of the dense fluidized bed. Typically, the temperature of the upper zone of the dense fluidized bed is conducive to capture of sulfur gases by a sorbent while a high temperature in the lower zone of the dense fluidized bed is maintained to be conducive to combustion of fuel and calcination of sorbent (for combustors) or gasification of fuel (for gasifiers).

18 Claims, 1 Drawing Figure

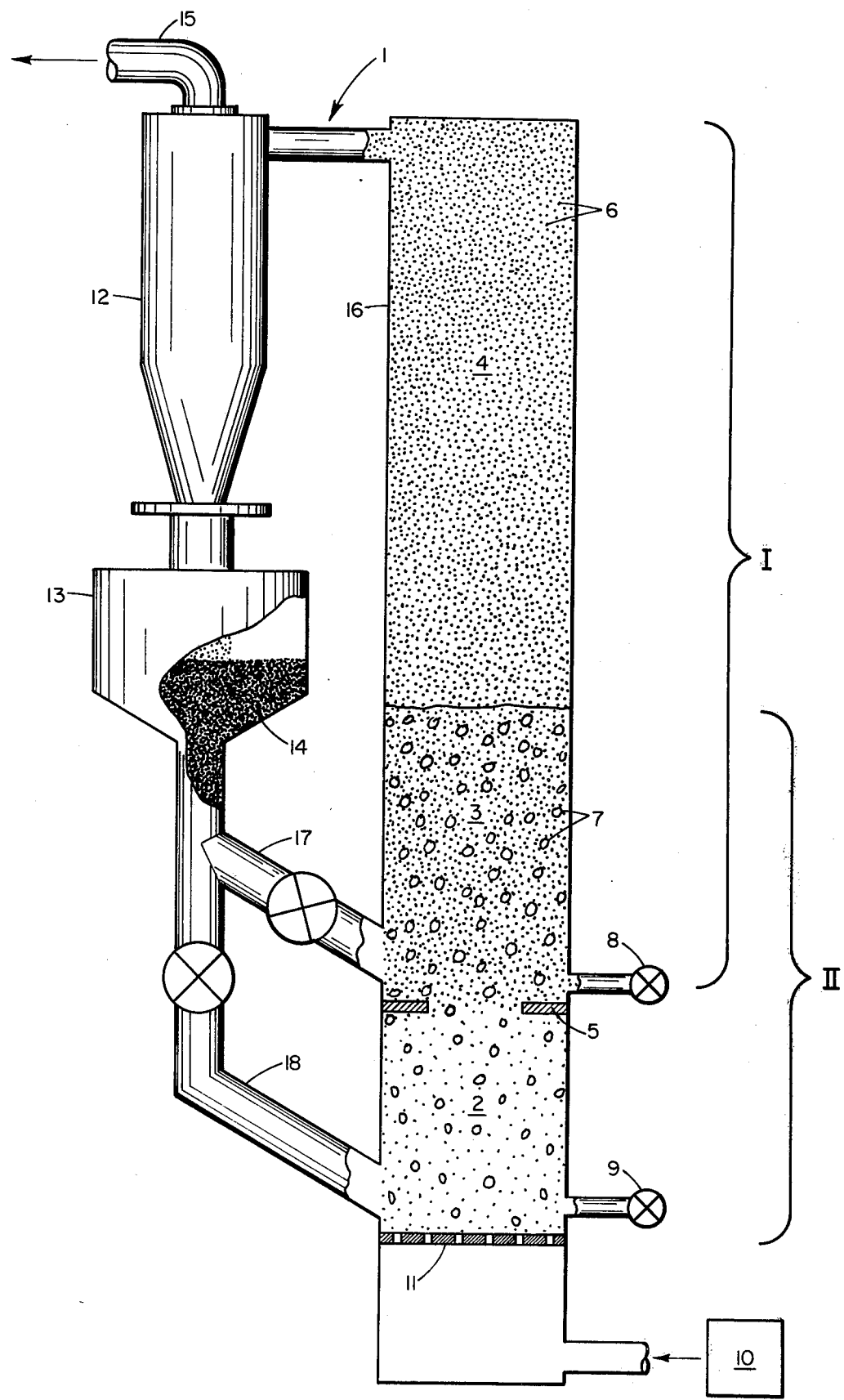

TWO-ZONE FLUID BED COMBUSTION OR GASIFICATION PROCESS

BACKGROUND OF THE INVENTION

This invention relates to methods of operating fluidized bed systems combining a dense fluidized bed and an entrained fluidized bed wherein the beds contain particle components having long-term chemical and physical stability in the system, one particle component being retained in the dense fluidized bed while the other is entrained and recirculated through a portion of the dense bed to increase residence time and promote more complete reaction of the reactant feed particles therein. In particular, the invention relates to the operation of such a multi-solid system wherein the dense bed is operated with two distinct temperature zones for optimum control of a fuel combustion or gasification and capture of released sulfur by an added sorbent. With slight modification, the method is utilized for both combustion and gasification of high-sulfur coal.

Operation of a uniform temperature, multi-solid fluidized bed system is taught and described in copending U.S. Patent application Ser. No. 803,831, filed June 6, 1977, now U.S. Pat. No. 4,084,545 which is assigned to the assignee of this application and which is incorporated herein by reference.

Operation of fluidized bed systems at more than one constant temperature is taught, in general, by prior workers. U.S. Pat. Nos. 3,597,327 and 3,847,563 are two which suggest two-temperature operation. The former patent discloses a method for pyrolyzing coal in a fluidized bed unit wherein the unit is separated into a first region and a second region. The coal is introduced into the bottom of the first region and is pyrolyzed therein. The region is operated with two zones containing different size particles (coarse coke and fine dolomite, for example) but both components are in dense fluidized condition (because of a difference in the superficial gas velocity) and are contiguous rather than coextensive as in the present invention. The lower region (2 zones) is operated at a temperature of about 1400° F. which is chosen for efficient coal carbonization. A second region operating at a higher temperature, about 1740° F., may receive treated material from the first region.

U.S. Pat. No. 3,847,563 discloses a two-stage fluid bed gasifier wherein coal is devolatilized in one bed at 1300°–1700° F. and the char is cycled to a second fluid bed gasifier which operates at about 2100° F. in the bottom and about 1800°–2000° F. at the top. Some of the char is combusted in the bottom and the resulting ash agglomerates and settles out. Remaining char is further gasified in the top of the bed as hot fluidizing air and steam pass out the top of the gasifier to be recycled to the devolatilizing bed. Sulfur is captured in the lower temperature devolatilization bed by lime and is removed therefrom as CaS.

Compared with previous fluidized bed combustion and gasification systems, the present invention allows reductions in unit size and heat transfer surface requirements because of higher superficial velocities which are obtainable, increases in combustion and gasification efficiencies and increased utilization of sorbent due to increased residence times of fuel and sorbent and precalcining of sorbent in the combustor.

Compared with the gasification in U.S. Pat. No. 3,847,563, the present gasification method takes place in one vessel and exposes the sorbent only to hot gases. In the prior patent two vessels are necessary. Sorbent is exposed to char in the devolatilization bed which then requires a separation if recycle is desired, and in the gasifier bed which causes agglomeration of sulfide with the ash resulting in an environmentally undesirable waste.

SUMMARY OF THE INVENTION

It is an objective to provide for temperature optimization of two successive physical or chemical reactions in a fluidized bed reactor.

It is an object to provide a method for fluidized bed operation wherein reaction of hydrocarbon feed is optimized at a first temperature and wherein released gases are recovered in situ by a particulate adsorbent at a lower second optimum temperature.

It is another object to provide such a method of optimization by operating and maintaining a fluidized bed system with two temperature zones.

It is also an object to provide such a method in a fluidized bed system which employs a multi-solid system for overlapping a dense fluidized bed with an entrained fluidized bed and allowing operation with high superficial velocities while maintaining efficiencies of combustion, heat transfer, and sorbent utilization.

In accordance with the objectives, the present invention is a method for operating a fluidized bed system, which comprises forming an entrained fluidized bed in a first space region containing a first relatively fine solid bed particle component and forming in a more limited space region at least partially within the first space region a dense fluidized bed containing a second relatively coarse solid bed particle component, both the first and second component particles essentially comprising a material having long-term physical and chemical stability in the fluidized bed system so as to be substantially nonagglomerating and not subject to substantial attrition therein, providing a baffling means within the dense fluidized bed within the more limited space region, such that the dense fluidized bed is divided into upper and lower zones, providing a recirculation path for the first particle component from the first space region through the dense fluidized bed in the more limited space region, operating the fluidized bed system at a velocity such that the second component particles are effectively retained in a fluidized state in the dense fluidized bed in the more limited space region, whereas the first component particles recirculate and interpenetrate through the second component particles of the dense fluidized bed, and maintaining a difference in temperature between the lower zone of the dense fluidized bed and the upper zone of the dense fluidized bed.

The proposed method is preferably used in a fluidized bed combustor (boiler) or gasifier; however, the method is generally useful for promoting two successive high-efficiency reactions at two different temperatures which can be controlled to optimize the particular reactions. Reactants for the first reaction in the lower zone of the dense fluidized bed at the first optimum temperature are fed into the lower zone in such a manner as to provide thorough mixing and reaction of the reactants as a result of the interaction of the second component particles and occasionally recirculated first component particles with the reactants. The reactants for the second reaction in the upper zone of the dense fluidized bed at the second optimum temperature may be fed with the first reactants into the lower zone of the dense fluidized bed or may be fed directly into the upper zone thereof in such a manner that thorough mixing and reaction takes place as a result of the interaction of the commingled first and second component particles with all the reactants. Temperature conditions for the first and second reactions are optimized within the lower and upper zones, respectively; however, either reaction may proceed to some degree in either zone.

At least one of the reactants may be a gaseous material, in which case the method may comprise fluidizing the bed system with the gaseous material. Other reactants may be solid particulate materials or liquid aerosols to be reacted with the gaseous material at a predetermined rate, and the method may comprise feeding the solid reactants into the bed system at the predetermined rate, fluidizing the bed system at a superficial velocity such that the gaseous reactant is supplied thereto at a rate sufficient to effect a substantially complete reaction of at least one of the reactants being fed, selecting the bed particle components so that the first component particles will be entrained at the superficial velocity while the second component particles will be effectively retained in the two-zone dense fluidized bed in the more limited space region and recycling the first component particles selectively through the upper and lower zones of the dense fluidized bed to maintain the temperature difference therebetween.

The solid reactant may comprise particles which are entrainable at the superficial velocity, and the method typically comprises providing a quantity of the second bed component particles which sufficiently restricts the movement of the reactant particles to effect a residence time thereof in the dense bed wherein the major portion of at lease one of the reactants is completely reacted in the more limited space region.

A particular advantage is realized when one of the reactants is a high-sulfur carbonaceous fuel, and the method comprises withdrawing an energy product from the fluidized bed system. The carbonaceous fuel may be burned in the fluidized bed system to produce an energy product which is heat or a solid or liquid carbonaceous fuel may be converted to an energy product which is a gaseous hydrocarbon.

The heat energy may be withdrawn by conveying a heat transfer medium through boiler tubes in the first space region. The method may also comprise passing a heat transfer medium through at least a portion of the recirculation path, whereby heat contained in the first particle component is transferred to the medium.

In a preferred mode of operation as a combustor or a gasifier, fuel is introduced into the lower zone of the dense fluidized bed and the combustion or gasification takes place in the lower zone at a temperature which is optimized for the reaction. The upper zone temperature is preferably optimized at a lower temperature, by the recycle of entrained first component particles, for the reaction of a sorbent with the volatilized sulfur gases from the first reaction. The sulfur sorbent may advantageously be added with the fuel and pass through the lower zone, as will be described hereinafter, or it may be added directly to the upper zone.

In a second mode of operation as a combustor or a gasifier, sorbent, recycled first component particles and cool air may be introduced into the lower zone of the dense fluidized bed and fuel and air are introduced into the upper zone thereof. The lower zone temperature is optimized for slow calcination of the sorbent and the upper zone is optimized at a higher temperature for coal gasification or combustion. The extent of the gasification or combustion reaction is controlled by the amount of air added therewith.

The sulfur sorbent typically comprises a carbonate of calcium and/or magnesium, such as are contained in limestone or dolomite, with a particle size in the range of about $-100$ to $-325$ U.S. mesh. The ratio of the calcium in the carbonate fed into the system to the sulfur in the carbonaceous fuel fed into the system is typically 1 to 3 moles of calcium to one mole of sulfur.

In the preferred method, the lower zone of the dense fluidized bed is typically maintained at a temperature in the range of about 1800°–2000° F. for coal combustion and 2000°–2200° F. for coal gasification and the upper zone is maintained in the range of about 1500°–1650° F. for coal combustion and 1600°–1750° F. for coal gasification. In the second mode of operation, the lower zone may be operated at about 1300°–1400° F. and the upper zone at about 1600°–1700° F.

The first and second solid bed particle components may consist essentially of the same material, the first component essentially comprising finer particles and the second component essentially comprising coarser particles. The particle components should have high temperature stability, be substantially inert under the operating conditions of the fluidized bed system, and be selected to provide good fluidization quality or entrainment and promote efficient mixing and heat transfer in the bed system. Where oxidizing conditions exist in the fluidized bed system, the bed particle components may essentially comprise metals or metallic oxides such as an oxide of iron, as it is contained in hematite. The components alternatively may essentially comprise aluminum oxide, silica sand, nickel, or nickel oxide. The finer component particles may be in the size range of about $-16 + 140$ U.S. mesh, and the coarser particles may be in the size range of about $-8 + 16$ U.S. mesh. The dense fluidized bed is retained in a container having a substantially cylindrical or prismatic portion and an intermediate baffling-means, and the quantity of the coarser particles is sufficient to fill the cylindrical or prismatic portion to a depth of at least about 10 inches when the bed is unfluidized. The superficial velocity of the fluidized bed may be in the range of about 10–60 feet per second.

The selective flow of the first solid bed component particles in the recirculation path to the upper or lower zones may be restricted so as to form a reservoir of particles upstream of the flow restriction, thereby accumulating in the reservoir a quantity of particles sufficient to prevent backflow in the recirculation path which might otherwise result from the fluidizing pressure applied to the dense fluidized bed. For an ash-forming process wherein the particles accumulated in the reservoir are accompanied by residual ash, the method may comprise fluidizing the particles in the reservoir to selectively entrain the ash, and removing the entrained ash for disposal. The accumulation of particles also allows cooling of the particles and they may be further cooled by fluidizing with cool air. This cooling would allow control of the upper or lower zones of the dense fluidized bed to produce lower temperature than if the second component particles were directly recycled.

DETAILED DESCRIPTION OF THE INVENTION

Referring to the FIGURE, a fluidized bed system 1 is diagrammed which is preferably used as a coal combustion boiler or a coal gasifier. Within a main chamber 16, there is formed an entrained fluidized bed 4 within a first space region I containing a first solid particle component 6. A dense fluidized bed 2, 3 is also formed in the chamber within a limited space region II partially within the first space region I and containing a second solid bed particle component 7. Particles 6 and 7 essentially comprise a material having long-term physical and chemical stability in the fluidized bed so as to be substantially nonagglomerating and not subject to substantial attrition therein.

The dense fluidized bed is divided by a baffling means comprising an orifice plate 5 which defines upper zone 3 and lower zone 2 within the dense fluidized bed. Orifice plate 5 somewhat restricts movement of the first and second component particles and thereby restricts the transfer of heat between upper and lower zones. Some particles are able to move from the upper to the lower zone.

The first component particles 6 are entrained in the flow of gas through the main chamber 16. The flow of gas originates from blower 10 which advances the gas into the lower end of the main chamber and through a distributor plate 11 below the lower zone of the dense fluidized bed. The first component particles are carried out of the main chamber and into a primary separator 12. The primary separator 12 is shown as a cyclone which removes substantially all the first component particles from the gas before the gas exits through exit flue 15. The separator 12, together with a reservoir chamber 13 and upper recycle leg 17, provide a recirculation path for the first component particle 6 from the first space region I through the upper zone 3 of the dense fluidized bed. Use of lower recycle leg 18 cycles first component particles through the lower zone as well as the upper zone and thereby enlarges the first space region I down to the distributor plate 11. Coordinated use of both recycle legs and the degree of cooling of the recycled particles can be used to effect the desired temperature difference in the two zones.

In the preferred combustor system, the three primary reactants may be particulate coal and a sorbent, such as limestone or dolomite, fed through a valve 9, and air fed through blower 10 and the distributor plate 11. The lower zone 2 of the dense fluidized bed is maintained at a temperature of about 1800°–2000° F. to burn the coal and to calcine the limestone, thereby increasing its absorption ability. The combustor is operated at a superficial gas velocity of about 30–60 ft/sec or higher, preferably at least 1–3 ft/sec higher than the minimum entrainment velocity of the first component particles. The temperature is maintained at about 1500°–1650° F. in the upper zone of the dense fluidized bed for effective $SO_2$ reaction to $CaSO_4$ and complete combustion. The temperature is maintained in the upper zone by control of the recycle rate of the first component particles and the cooling of the recycle inventory 14 in the reservoir chamber 13. Gases used to cool the recycle inventory for control of the temperature may be recycled (not shown) to the blower 10 for introduction as preheated gas into the combustor.

In the preferred gasifier system, the primary reactants may be particulate coal (e.g., −20 mesh), which is fed through valve 9; oxygen (or air or hydrogen) and/or steam, which are introduced through the distributor plate 11 at the bottom of the main chamber by the blower 10; and powdered dolomite or limestone, which enters through valve 8. Nearly complete gasification is accomplished in the lower zone of the dense fluidized bed under oxygen deficient conditions at a bed temperature of 2000°–2200° F. Hydrogen sulfide in the fuel gas is captured in the upper zone of the dense fluidized bed where the bed temperature is reduced to about 1600°–1750° F. by the introduction above the orifice plate of sorbent and the recycled first component particles. The gasifier is preferably operated at a superficial gas velocity of about 15–40 ft/sec.

In a second method, the reactants are the same as above but either combustion or gasification may take place in the upper zone at a temperature of about 1600°–1700° F. The coal and desired air are introduced into the upper zone through valve 8 above the orifice plate 5. Combustion of a portion of the coal provides the heat to raise the temperature of the fluidizing gas. The lower zone of the dense fluidized bed is controlled to a temperature of about 1300°–1400° F. to slowly calcine the sorbent (limestone) which is introduced through valve 9 into the lower zone. The slow calcination improves the sorbent ability to adsorb sulfur compounds in the upper zone. Moreover, the sorbent does not come into contact with $SO_2$ during calcination in the lower zone, hence avoiding premature plugging of pores. Relative temperatures may be maintained by recycling more cool first component particles through lower recycle leg 18 than through upper recycle leg 17 or cool gas from blower 10 may be used to fluidize the second component particles in the lower zone.

Limestone particles in the size range of about −100 to −325 U.S. mesh have been found to be effective in the invention. The size of the pulverized limestone or dolomite particles to be used for a particular application may be determined in accordance with the most economical compromise, depending on limestone type, the amount of sulfur in the coal, limestone cost, grinding and screen costs, disposal and/or processing considerations and the allowable level of sulfur in the stack gases.

The first and second solid bed particle components essentially comprise a material having long-term physical and chemical stability in the fluidized bed system so as to be substantially nonagglomerating and not subject to substantial attrition therein. In the general case, this material may catalyze or even enter temporarily into a chemical reaction occurring in the fluidized bed system, but over a period of time measured in weeks or months it is not substantially "used up" in the chemical sense, nor does it change its physical characteristics substantially, either by agglomeration or attrition, to such an extent that its behavior in the fluidized bed system is substantially altered. The components are preferably, though not necessarily, comprised of the same material. For the case of the fluidized bed combustor, it has been found that in addition to an iron oxide, other suitable first and second component materials are aluminum oxide, nickel, and nickel oxide.

EXAMPLES OF PREFERRED EMBODIMENTS

A working model fluidized bed combustor such as shown in the FIGURE has been constructed, wherein the main chamber 16 was formed from a 6-inch diameter steel tube about ten feet in length. A 4-inch diameter orifice plate 5 was located about 2 feet above the distributor plate and the inlet for valve 9 in the FIGURE was located 1 inch above the distributor plate. The lower recycle leg 18 entered at a point immediately above the distributor plate and the upper recycle leg entered immediately above the orifice plate.

Both the first and second component particles were Speculite (hematite as described above). The first component particles were in the range of −16 +70 U.S. mesh and the second component particles in the range of −10 +16 U.S. mesh. The limestone was −325 U.S. mesh.

A steady-state operation was established using only the lower recycle leg mentioned above for recirculating entrained particles. The lower leg was then closed and the upper recycle leg opened, allowing the entrained first component particles to recycle only through the upper zone of the dense fluidized bed. The apparatus was operated both with and without the orifice plate and it was discovered that no significant temperature difference was detectable without the orifice plate at high velocity. With the orifice plate in position, a temperature difference of 250° F. was obtainable (1700° F. in the lower zone and 1450° F. in the upper zone) at a superifical gas velocity of about 30 ft/sec.

Several runs were made to determine whether (1) two distinct temperature zones could be maintained, (2) improved combustion efficiency resulted, and (3) increased sorbent utilization efficiency resulted.

Combustion efficiency is used to mean the percentage of the total carbon entering the fluidized bed system which is actually burned.

Sulfur retention is the percentage of total sulfur entering the fluidized bed system which is actually reacted with the sorbent.

Sorbent utilization efficiency is used to mean the molar ratio of calcium to sulfur at a given retention level.

It was discovered that two temperatures could be maintained and that the two zones resulted in slightly improved combustion and sorbent utilization efficiencies. Moreover, the two zones allow the nearly complete combustion of coal at high bed temperatures without sacrificing desulfurization capability. This may be a significant advantage of the present method.

In gathering the experimental data shown in Table 1, the lower zone dense bed was maintained at 2 feet in height. Reduction to one foot reduced the magnitude of the temperature difference obtainable. A 3-inch orifice plate was also substituted for the 4-inch orifice plate, but coal combustion was not sustainable and the 4-inch plate was reinstalled for the examples. The following data were recorded during five trial runs of the apparatus.

TABLE 1

|  | 1005-2 | 1008-1 | 1005-4 | 1008-3 | 1007-2 |
|---|---|---|---|---|---|
| Ave. Temp, Dense Bed (°F.) | | | | | |
| Lower Zone | 1610 | 1510 | 1765 | 1695 | 1730 |
| Upper Zone | 1610 | 1500 | 1605 | 1525 | 1460 |
| Ave. Temp. Difference | 0 | 10 | 160 | 170 | 270 |
| Air Feed Rate, SCFH | 7020 | 5290 | 7370 | 7340 | 5930 |
| Superficial Gas Velocity, ft/sec | | | | | |
| Lower Zone | 34.3 | 24.6 | 38.8 | 37.4 | 30.6 |
| Upper Zone | 34.3 | 24.5 | 36.0 | 34.4 | 26.9 |
| Entrained Solid Recycle Rate, lbs/hr | — | 600 | — | 1150 | 700 |
| Coal Feed Rate, lbs/hr | 51.2 | 37.5 | 52.1 | 54.4 | 46.0 |
| Limestone Feed Rate, lbs/hr | 6.3 | 4.4 | 6.3 | 7.3 | 5.0 |
| Ca/S Molar Ratio | 0.81 | 0.81 | 0.80 | 0.92 | 0.75 |
| Sulfur Retention, % | 7.8 | 47.4 | 43.9 | 60.3 | 58.6 |
| Combustion Efficiency, % | 85.7 | 86.2 | 88.3 | 87.2 | 88.9 |
| Off gas Analysis, ppm $SO_2$ | 2280 | 1890 | 2010 | 1490 | 1630 |
| Calculated Excess Air, % | 12.4 | 15.6 | 15.9 | 10.5 | 5.5 |
| Second Component | 55 pounds Speculite, −8 +14 U.S. mesh | | | | |
| First Component | About 145 pounds Concrete Sand, −20 U.S. mesh | | | | |
| Coal | Illinois, #6, −8 U.S. mesh | | | | |
| Sorbent | Piqua Limestone, −200 U.S. mesh | | | | |

It is believed that as in example 1005-4, a temperature of above 1600° F. in the upper zone is somewhat high for effective sulfur removal in the combustor. The upper limit is therefore preferably about 1600° F. for the combustor upper zone temperature.

Examples 1008-3 and 1007-2 show the result of slightly lower upper zone temperature and larger temperature differences between zones when compared with examples 1005-2 and 1008-1. The combustion efficiency is maintained while increasing the coal feed rate and sulfur retention and decreasing the amount of sulfur which passes through the system without capture. Examples 1005-2 and 1008-1 show the results obtainable while maintaining a uniform temperature throughout the dense bed.

We claim:
1. A method for operating a fluidized bed system which comprises forming an entrained fluidized bed in a first space region containing a first relatively fine solid bed particle component and forming in a more limited space region partially within the first space region a dense fluidized bed containing a second relatively coarse solid bed particle component, both the first and second component particles essentially comprising a material having long-term physical and chemical stability in the fluidized bed system so as to be substantially nonagglomerating and not subject to substantial attrition therein, providing a baffling means within the dense fluidized bed within the more limited space region, such that the dense fluidized bed is divided into contiguous upper and lower zones which remain in fluid communication, providing a recirculation path for the first particle component from the first space region through the dense fluidized bed in the more limited space region, operating the fluidized bed system at a velocity such that the second component particles are effectively retained in a fluidized state in the dense fluidized bed in the more limited space region, whereas the first component particles recirculate and interpenetrate through the second component particles of the dense fluidized bed, and maintaining a difference in temperature between the lower zone of the dense fluidized bed and the upper zone of the dense fluidized bed.

2. A method as in claim 1 for promoting the high-efficiency reaction between at least two reactants, comprising
feeding the reactants into the fluidized bed system in such manner as to provide thorough mixing of the reactants as a result of the motion of the commingled particles in the dense fluidized bed.

3. A method as in claim 2 wherein at least one of the reactants is a gaseous material, comprising
fluidizing the bed system with the gaseous material.

4. A method as in claim 3 wherein one of the reactants is a carbonaceous fuel, comprising
withdrawing an energy product from the fluidized bed system.

5. A method as in claim 4, wherein the carbonaceous fuel is burned in the fluidized system and the energy product is heat.

6. The method as in claim 5 wherein the carbonaceous fuel is a particulate coal.

7. The method as in claim 4 wherein the carbonaceous fuel is a solid particulate or liquid aerosol, the carbonaceous fuel is gasified and the energy product is a gaseous hydrocarbon.

8. The method as in claim 7 wherein the carbonaceous fuel is a particulate coal.

9. The method as in claim 1 wherein the lower zone of the dense fluidized bed is maintained at a higher temperature than the upper zone of the dense fluidized bed.

10. The method as in claim 9 wherein the recirculation path for the first particle component is provided from the first space region through the upper zone of the dense fluidized bed.

11. The method as in claim 10 for promoting the high efficiency reaction of at least two reactants wherein a carbonaceous fuel is one of the reactants comprising
burning the carbonaceous fuel in the lower zone of the dense fluidized bed and
withdrawing an energy product from the fluidized bed system.

12. The method as in claim 11 wherein sulfur is one of the reactants comprising
feeding a sulfur sorbent into the upper zone of the dense fluidized bed.

13. The method as in claim 10 for promoting the high efficiency reaction of at least two reactants wherein a carbonaceous fuel is one of the reactants comprising
gasifying the carbonaceous fuel in the lower zone of the dense fluidized bed and
withdrawing an energy product from the fluidized bed system.

14. The method as in claim 1 wherein the upper zone of the dense fluidized bed is maintained at a higher temperature than the lower zone of the dense fluidized bed.

15. The method as in claim 14 wherein the recirculation path for the first particle component is provided from the first space region through the lower zone of the dense fluidized bed.

16. The method of claim 15 for promoting a high-efficiency reaction of at least two reactants wherein one of the reactants is a carbonaceous fuel.

17. The method of claim 16 wherein at least a portion of the carbonaceous fuel is burned in the upper zone of the dense fluidized bed.

18. A method as in claim 17 wherein the carbonaceous fuel contains sulfur comprising
feeding a sulfur sorbent into the fluidized bed system.

* * * * *